Figure 1:
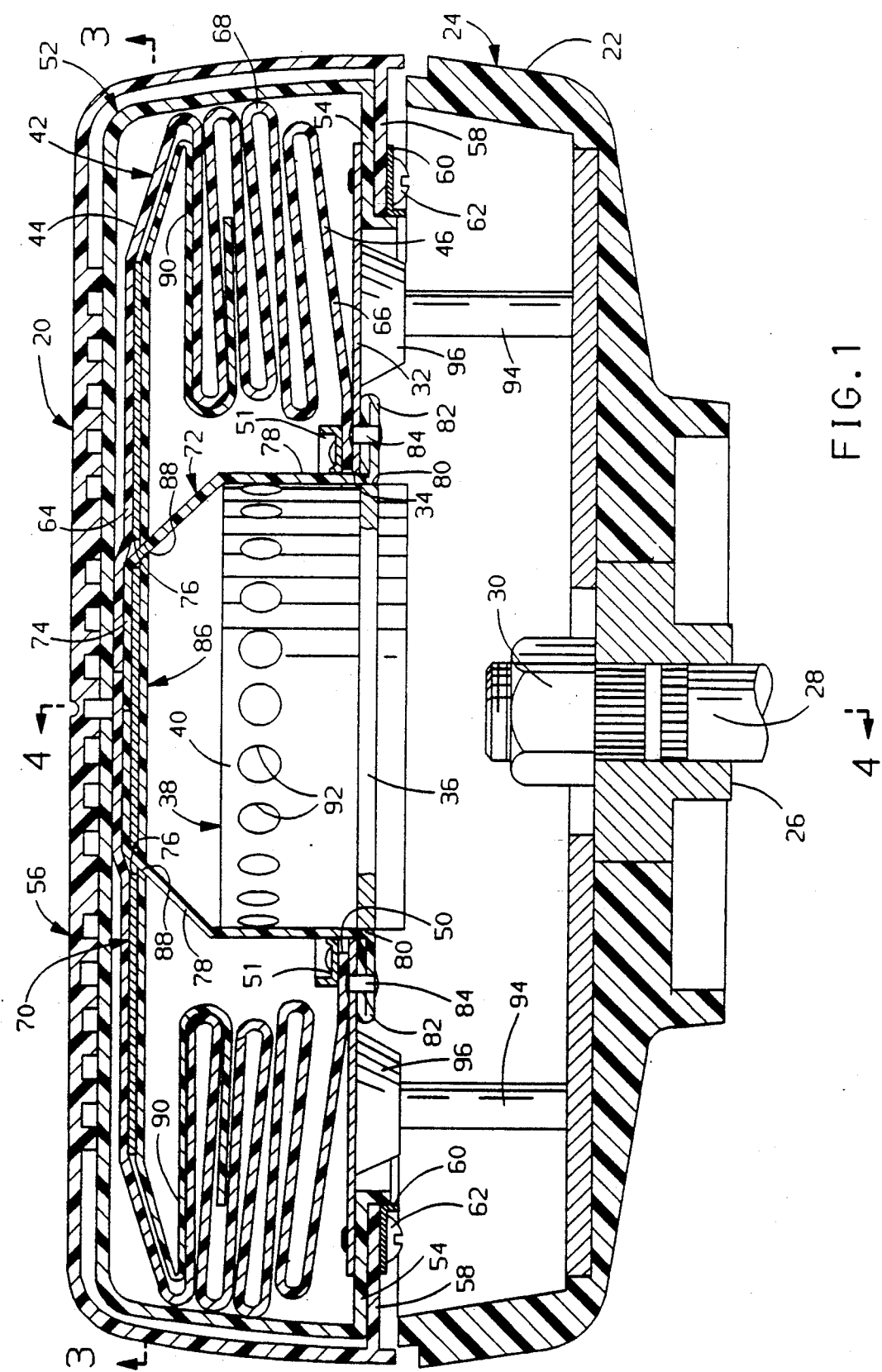

United States Patent [19]

Frantz et al.

[11] Patent Number: 5,174,601
[45] Date of Patent: Dec. 29, 1992

[54] INFLATION GAS FLOW DIRECTING MEMBER FOR AIR BAG SYSTEM

[75] Inventors: Brian H. Frantz, Royal Oak; Jack L. Jensen, Highland; Gregory A. Miller, Troy, all of Mich.

[73] Assignee: General Motors Corporation, Detroit, Mich.

[21] Appl. No.: 752,134

[22] Filed: Aug. 29, 1991

[51] Int. Cl.⁵ .............................................. B60R 21/26
[52] U.S. Cl. .................................. 280/740; 280/742; 280/743
[58] Field of Search ............... 280/728, 729, 743, 736, 280/742, 731, 730, 732, 740

[56] References Cited

U.S. PATENT DOCUMENTS

| | | | |
|---|---|---|---|
| 3,819,205 | 6/1974 | Dunford | 280/731 |
| 3,827,715 | 8/1974 | Lynch | 280/735 |
| 4,013,305 | 3/1977 | Ichihara | 280/731 |
| 4,887,842 | 12/1989 | Sato | 280/731 |
| 5,009,452 | 4/1991 | Miller | 280/730 |
| 5,060,973 | 10/1991 | Giovanetti | 280/736 |

FOREIGN PATENT DOCUMENTS 3829368  3/1990  Fed. Rep. of Germany ...... 280/730

Primary Examiner—Karin L. Tyson
Attorney, Agent, or Firm—Charles E. Leahy

[57] ABSTRACT

An occupant restraint system includes a folded cushion having an upper wall portion against which is seated a reaction member mounted to the support of the system by a strap. The periphery of the reaction member is sealed to the upper wall portion of the cushion by a sheet of flexible material which covers the reaction member and has its peripheral edge portions interfolded with the folded side and end walls of the folded cushion.

4 Claims, 3 Drawing Sheets

INFLATION GAS FLOW DIRECTING MEMBER FOR AIR BAG SYSTEM

BACKGROUND OF THE INVENTION

This invention relates to occupant restraint systems and more particularly to occupant restraint systems of the type which releasably secure the cushion against initial deployment normal to or toward the occupant and direct such initial deployment laterally of the occupant.

U.S. Pat. No. 5,009,452, Occupant Restraint System, issued Apr. 23, 1991 to Gregory A. Miller and assigned to the assignee of this invention, discloses an occupant restraint system which includes a reaction member mounted to the support of the restraint module and located above the inflator of an occupant restraint system. The reaction member is sealed to the upper wall portion of the occupant restraint cushion to prevent the impingement of pressure fluid from the inflator against such upper wall portion during initial deployment of the cushion and thereby restrict such initial deployment laterally of the occupant through the unfolding of the folded side and end walls of the cushion.

Copending application (G 8051) S.N. 07/752,133. Occupant Restraint System, Filed Aug. 29, 1991, Frantz et al. and assigned to the assignee of this invention, discloses a reaction member type system wherein the reaction member is mounted to the support by a flexible strap or mounting member which is looped through the reaction member and has the legs thereof secured to the support of the system. The reaction member is pocketed to the inside of the upper wall of the cushion by flaps of flexible material. In one embodiment, the flaps are individual and secured to the inside of the upper wall of the cushion. The flaps overlap each other and are sandwiched to the reaction member by a retainer member which is secured to the reaction member. In another embodiment, the flaps are part of sheet of flexible material which is provided with tear lines to separate into flaps.

The occupant restraint system of this invention is also of the type which includes a reaction member mounted to the support by a flexible strap or mounting member. However, it includes an alternate manner of sealing the interface between the reaction member and the upper wall of the occupant restraint cushion. In the preferred embodiment, a sheet of flexible material covers the reaction member and has the periphery thereof interfolded with the folded side and end walls of the folded cushion so as to seal the interface between the periphery of the reaction member and the upper wall of the cushion. The sheet of flexible material is directly secured to the reaction member in any suitable manner, such as by adhesive, and no retainer member is necessary.

The primary feature of this invention is to provide an occupant restraint system having a reaction member flexibly mounted to a support and releasably sealed to the inside of the upper wall of the occupant restraint cushion by a sheet of flexible material which covers the reaction member and has the periphery thereof interfolded with the folded side and end walls of the folded occupant restraint cushion.

Figure 2:
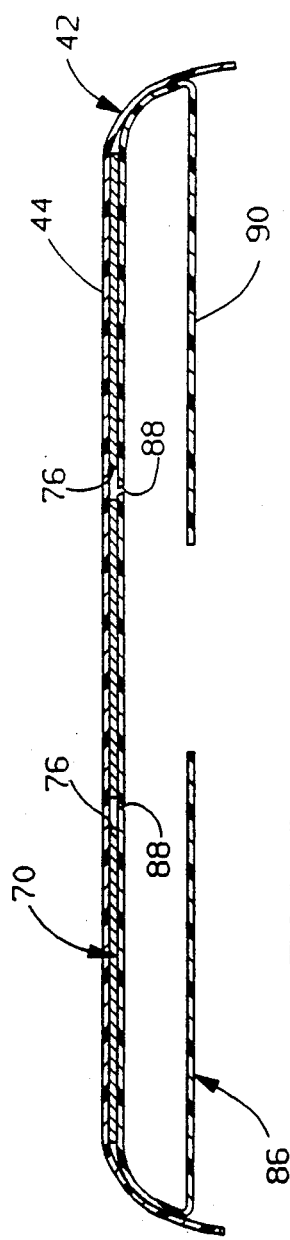
Figure 3:
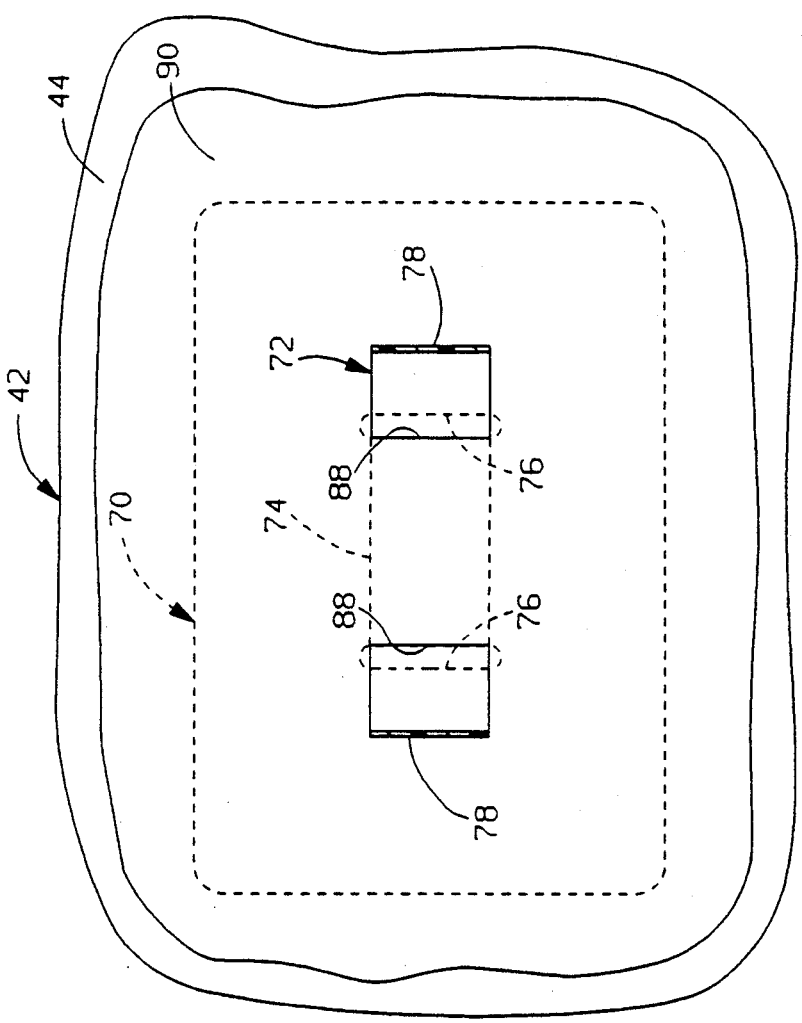
Figure 4:
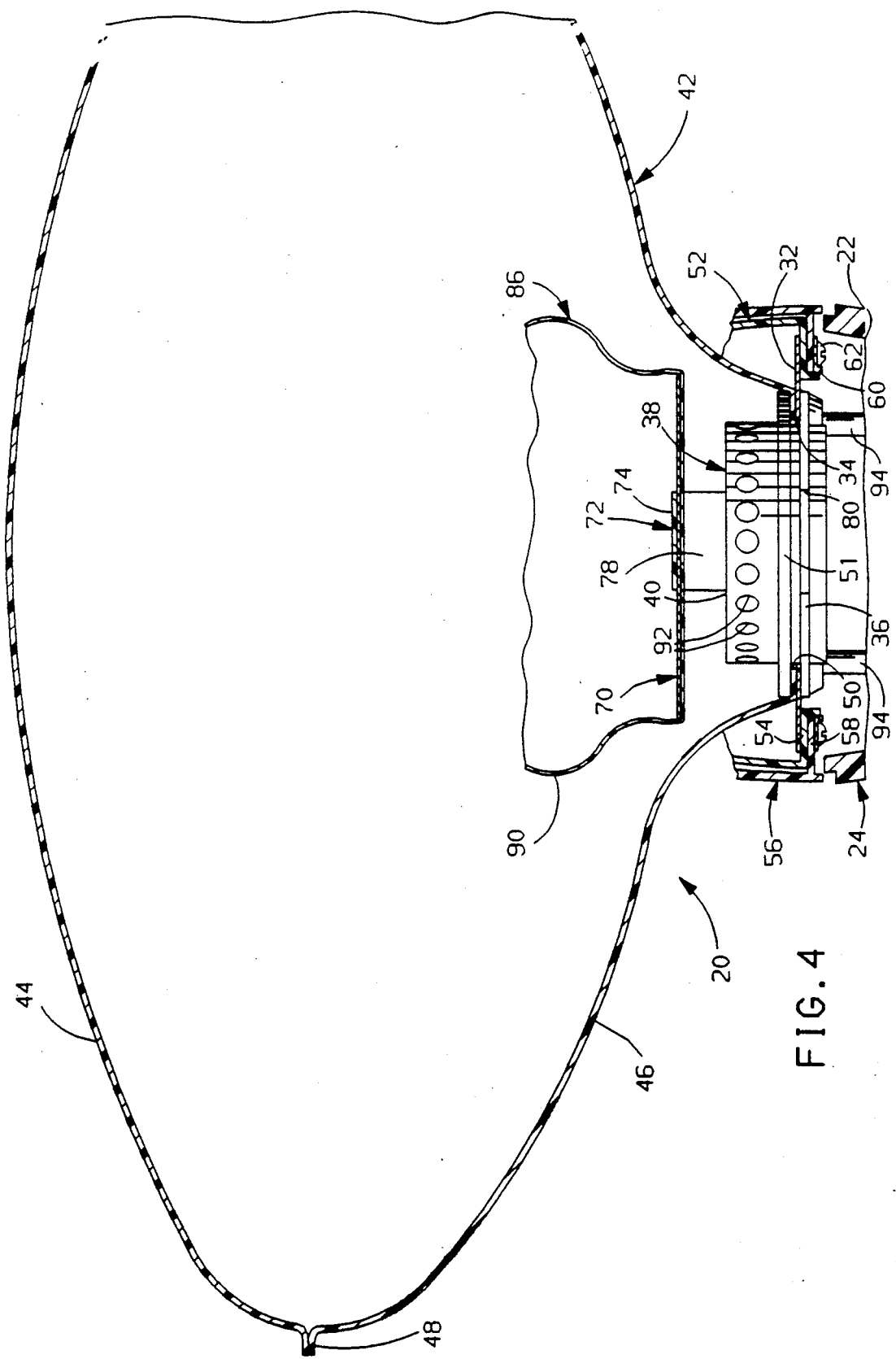

This and other features of the invention will be readily apparent from the following specification and drawings wherein:

FIG. 1 is a sectional view of an occupant restraint system according to this invention.
FIG. 2 is an enlarged view of a portion of FIG. 1.
FIG. 3 is a view taken along line 3—3 of FIG. 1; and,
FIG. 4 is a section view taken along line 4—4 of FIG. 1 with the occupant restraint cushion deployed.

Referring now to FIG. 1 of the drawings, an occupant restraint system 20 according to this invention is shown mounted to the hub portion 22 of a vehicle steering wheel 24. The hub portion includes a splined bushing 26 which receives the splined upper end of the vehicle steering shaft 28 and is secured thereto at 30 to secure the vehicle steering wheel 24 to the vehicle steering system.

A generally rectangularly shaped plate or support 32 has a central circular opening 34. The flange 36 of a conventional inflator 38 underlies the lower side of the support 32 around the opening 34. The outlet portion 40 of the inflator projects within the interior of a folded occupant restraint cushion 42. The cushion 42 includes upper and lower or forward and rearward circular members 44 and 46 which are secured together at their circular edge portions 48, FIG. 4. The upper or forward cushion member 44 provides the impact surface engaged by the driver when the cushion is inflated The lower or rearward cushion member 46 has a central opening 50, the edge portion of which is located underneath a retainer 51. Spaced fasteners secure the flange 36, the edge portion of the opening 50 and retainer 51 to the support 32. as shown in the Frantz et al. application.

The inflator 38 is a conventional gas generator which is actuated to produce gas or pressure fluid when a suitable sensor, either acceleration or velocity or otherwise, senses an actual or impending impact of the vehicle with an obstacle and sends an appropriate signal to the inflator.

A container 52 for the cushion 42 is formed of plastic material and has a generally box-like rectangular shape. The container houses the folded occupant restraint cushion 42 and has a segmented flange 54 which underlies the support 32. An outer decorative cover 56 of plastic material is of the same general shape as the container 52. The cover 56 has a segmented flange 58 which overlies the flange 54 of the container. A retainer 60 overlies the flanges 54 and 58 and is secured at 62 to the support 32 to secure the container and cover to the support 32.

The cover 56 and container 52 have respective molded in lines and molded in perforations so as to separate in pairs of flaps during deployment of the cushion. Reference may be had to U.S. Pat. No. 4,903,986 Cok et al., Occupant Restraint System, issued Feb. 27, 1990 for the details of the cover and container. As seen in FIG. 1, the cushion 42 is folded to provide a generally rectangularly shaped upper wall portion 64, connected to a lower wall portion 66 by fan or pleat folded wall portions.

A generally rectangularly shaped reaction plate or member 70 is of the general size of the upper wall portion 64 and seats thereagainst. A flexible member or strap 72 has its bight 74 looped through a pair of slots or openings 76 in the reaction member 70. The legs 78 of the strap 72 pass around the inflator 38, through diametrically opposed notch segments 80 in the flange 36 of the inflator, and through the retainer 51 and opening 50 in the support 32 to the underside of the support. The ends of the legs are doubled over at 82 and riveted or otherwise secured at 84 to the underside of the support 32 adjacent the opening 50 therethrough.

As shown in FIGS. 1, 2 and 3, a sheet of flexible material 86 covers the reaction member 70. The sheet of flexible material 86 can be of the same material as that of the cushion 42. The sheet of flexible material 86 is generally of square shape and has slots or openings 88 to permit passage of the legs 78 of the strap 72 therethrough. The peripheral edge portion 90 of the sheet of flexible material 86 is interfolded with the folded wall portions 68 of the cushion 42 so that the interface between the reaction member 70 and the upper wall portion 64 of the cushion is sealed.

When the inflator 38 receives an appropriate signal, the inflator generates gas or pressure fluid which exits into the interior of the folded cushion 42 through the upper outlet ports 92 of the inflator 38. The pressure fluid initiates unfolding of the folded wall portions 68 of the cushion 42 through the separable flaps in the longer or 6 and 12 o'clock side walls and shorter or 3 and 9 o'clock side walls of the container 52 and cover 56 to initiate deployment of the cushion 42 laterally of the occupant, as set forth in the aforenoted Cok et al. patent. During this initial deployment of the cushion 42, the upper wall portion 64 of the cushion 42 remains generally stationary since the sheet of flexible material 86 seals the interface between the periphery of the reaction member 70 and such upper wall portion so that the pressure fluid cannot enter through such interface and impinge against the upper wall portion 64. Thus, the upper or forward wall 44 of the cushion does not initially deploy toward the occupant.

As the volume and pressure of the pressure fluid increase, the folded wall portions 68 of the cushion continue to unfold into continuations of the sealed upper wall portion 46 of the cushion 42. When such wall portions are substantially unfolded, the pressure fluid passes around the peripheral edge portion 90 of the sheet of flexible material 86 and impinges against the upper wall portion 64 so that the forward or upper wall 44 of the cushion moves normal to or toward the occupant subsequent to the initial deployment laterally of the occupant as shown in FIG. 4.

The sheet of flexible material 86 may be secured, such as by adhesive, to the reaction member 70 to ensure that the sheet of flexible material does not come into contact with the upper outlet portion 40 of the inflator 38 when the inflator has ceased to generate pressure fluid. During the time that the inflator is generating pressure fluid, the passage of the pressure fluid from the outlet ports 92 of the inflator 38 maintains the center or inner portion of the sheet of flexible material 86 against the reaction member 70, as shown in FIG. 4, and maintains the peripheral edge portion 90 of the sheet of flexible material in extending relationship to the edge portion of the reaction member, FIG. 4.

The support 32, inflator 38, cushion 42, container 52, cover 56, reaction member 70, strap 72 and sheet of flexible material 86 are assembled together to provide a self-contained restraint system module.

The module is assembled in overlying relationship to the opening of the hub portion 22 of the steering wheel by fasteners, not shown, which extend upwardly through openings in the hub portion 22 and into tapped cylindrical tubes or struts 94 which are secured to downward embossments 96 of support 32.

In order to further ensure that none of the pressure fluid enters the space between the reaction member 70 and the upper wall portion 46 of the cushion 42, the openings 76 in the reaction member 70 can be sealed to the legs 78 of the strap 72 passing therethrough.

The strap 72 can be formed of a multiple folded over piece of material, such as the material of the cushion 42. Further, the portions of the legs 78 of the strap 72 which pass near the outlets 92 of the inflator 38 can be appropriately coated, such as with a silicone base material, to prevent deterioration of their strength.

Thus, this invention provides an occupant restraint system of the type shown in the aforenoted Miller patent in order to provide for initial deployment of an occupant restraint cushion laterally of an occupant and delayed deployment of the cushion normal to or toward the occupant.

The embodiments of the invention in which an exclusive property or privilege is claimed are defined as follows:

1. An occupant restraint system comprising, support means, an inflatable occupant restraint cushion including a lower wall portion mounted to the support means, an upper wall portion spaced from the support means, and folded wall portions interconnecting the upper and lower wall portions, means mounting the lower wall portion to the support means, a source of pressure fluid mounted to the support means for supplying pressure fluid to inflate and deploy the occupant restraint cushion, a pressure fluid reaction member covering the inside of the upper wall portion, flexible means interconnecting the reaction member and the support means to mount the reaction member in overlying spaced relationship to the source of pressure fluid, and a sheet of flexible material overlying the reaction member and folded with the folded wall portions of the cushion to pocket the reaction member to the inside of the upper wall portion of the cushion and seal the interface between the reaction member and such upper wall portion against the entry of pressure fluid during initial deployment of the cushion and unfolding of the folded wall portions of the cushion.

2. An occupant restraint system comprising, support means, an inflatable occupant restraint cushion including a lower wall portion mounted to the support means, an upper wall portion spaced from the support means, and folded wall portions interconnecting the upper and lower wall portions, means mounting the lower wall portion to the support means, a source of pressure fluid mounted to the support means for supplying pressure fluid to inflate and deploy the occupant restraint cushion, a pressure fluid reaction member covering the inside of the upper wall portion, flexible means interconnecting the reaction member and the support means to mount the reaction member in overlying spaced relationship to the source of pressure fluid, a sheet of flexible material overlying the reaction member and folded with the folded wall portions of the cushion to pocket the reaction member to the inside of the upper wall portion of the cushion and seal the interface between the reaction member and such upper wall portion against the entry of pressure fluid during initial deployment of the cushion and unfolding of the folded wall portions of the cushion, and means securing the sheet of flexible material to the reaction member.

3. The combination recited in claim 1 wherein the sheet of flexible material is of the same material as the cushion.

4. The combination recited in claim 1 wherein the flexible means comprises a strap looped through the reaction member and through the sheet of flexible material.

* * * * *